United States Patent

Harris

(10) Patent No.: US 6,931,862 B2
(45) Date of Patent: Aug. 23, 2005

(54) COMBUSTOR SYSTEM FOR AN EXPENDABLE GAS TURBINE ENGINE

(75) Inventor: Mark M. Harris, La Jolla, CA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 100 days.

(21) Appl. No.: 10/426,314

(22) Filed: Apr. 30, 2003

(65) Prior Publication Data

US 2004/0216463 A1 Nov. 4, 2004

(51) Int. Cl.$^7$ ................ F23R 3/50; F23R 3/58
(52) U.S. Cl. ............... 60/804; 60/732; 60/733
(58) Field of Search ................ 60/804, 732, 733

(56) References Cited

U.S. PATENT DOCUMENTS

| | | | |
|---|---|---|---|
| 3,915,619 A | 10/1975 | Quigg et al. | |
| 3,934,409 A | 1/1976 | Quillevere et al. | |
| 4,112,676 A | 9/1978 | DeCorso | |
| 4,265,615 A | 5/1981 | Lohmann et al. | |
| 4,420,929 A | 12/1983 | Jorgensen et al. | |
| 4,590,769 A | 5/1986 | Lohmann et al. | |
| 4,683,715 A | 8/1987 | Iizuka et al. | |
| 4,928,481 A * | 5/1990 | Joshi et al. | 60/737 |
| 4,974,415 A * | 12/1990 | Shekleton et al. | 60/733 |
| 5,123,239 A | 6/1992 | Rodgers | |
| 5,131,223 A | 7/1992 | Owen | |
| 5,158,445 A * | 10/1992 | Khinkis | 431/10 |
| 5,261,224 A * | 11/1993 | Shekleton et al. | 60/804 |
| 5,303,543 A * | 4/1994 | Shah et al. | 60/804 |
| 5,343,690 A | 9/1994 | Shekleton et al. | |
| 5,428,275 A | 6/1995 | Carr et al. | |
| 5,481,867 A | 1/1996 | Dubell et al. | |
| 5,657,632 A | 8/1997 | Foss | |
| 5,727,378 A | 3/1998 | Seymour | |
| 5,746,048 A * | 5/1998 | Shah | 60/776 |
| 5,749,219 A | 5/1998 | DuBell | |
| 5,826,429 A | 10/1998 | Beebe et al. | |
| 5,927,066 A * | 7/1999 | Shekleton et al. | 60/804 |
| 6,000,212 A | 12/1999 | Kolaczkowski et al. | |
| 6,035,626 A | 3/2000 | Wahl et al. | |
| 6,253,555 B1 | 7/2001 | Willis | |

FOREIGN PATENT DOCUMENTS

| | | |
|---|---|---|
| EP | 0 691 512 A2 | 1/1996 |
| EP | 1 130 322 A1 | 9/2001 |

* cited by examiner

*Primary Examiner*—Ted Kim
(74) *Attorney, Agent, or Firm*—Carlson, Gaskey & Olds

(57) ABSTRACT

A combustor system for a miniature gas turbine engine includes fuel injection via orifices which direct fuel into fuel-air injection tubes which feed a fuel-rich mixture of fuel and air into a leading end of the combustor liner to form a primary burning region. Fuel system pressures are kept low and controlled by control of the fuel injection port size and number. Fuel breakup is via airblast and tube wall impingement. The fuel-air injection tubes are directed circumferentially, radially outward and toward the front end of the combustor. Air is fed into the combustor such that two distinct burning regions are created. Each region approximates a "well-stirred reactor" and the combination of the two regions results in an efficient use of combustion volume.

18 Claims, 6 Drawing Sheets

COMBUSTOR SYSTEM FOR AN EXPENDABLE GAS TURBINE ENGINE

BACKGROUND OF THE INVENTION

The present invention relates to a miniature gas turbine engine, and more particularly to a combustor system in which each combustion region approximates a well-stirred reactor.

Miniature turbojet engines (100 lbf thrust and smaller) are often utilized in single usage applications such as reconnaissance drones, cruise missiles, decoy and other weapon applications, including air-launched and ground-launched weapon systems. The use of such an engine greatly extends the range of the weapon in comparison to the more conventional solid fuel rocket engine. Miniature gas turbine engines are difficult to fabricate economically for general expendable usage in large numbers.

To achieve economically feasible extended range expendable propulsion sources for such weapon system, it is necessary that the gas turbine engines be manufactured relatively inexpensively yet provide a high degree of reliability and efficiency. One component that greatly affects performance yet is rather complicated to manufacture is the combustor system.

Miniature gas turbine engines typically utilize annular combustor shapes that wrap around other engine features such as an exhaust tailpipe or a turbine wheel to minimize frontal area in order to maximize the thrust per unit drag. If the engine frontal area is minimized, the combustor internal volume must be utilized optimally.

Miniature gas turbine engine combustor systems may not have room for conventional fuel injection systems and require high-density, high-viscosity fuels to maximize thrust. The combustor system must accommodate these fuels and provide reliable ignition and stable operation. These requirements are a challenge given the size and cost limitations for an expendable system.

Accordingly, it is desirable to provide an inexpensive and reliable combustor system having a minimal frontal area for a miniature gas turbine engine which achieves stability throughout the flight envelope and combustion efficiency at cruise conditions.

SUMMARY OF THE INVENTION

The combustor system according to the present invention includes an annular combustor liner with a minimized number of fuel injection tubes, no hot-side cooling, and reduced hole count. Fuel injection is via orifices that direct fuel into fuel-air mixture tubes, which feed a fuel-rich mixture of fuel and air into a leading end of the combustor liner to form a primary burning region.

Fuel system pressures are kept relatively low and controlled by control of the fuel injection port size and number. Fuel breakup is via airblast and tube wall impingement. The fuel-air mixture tubes are directed circumferentially, radially outward and toward the front end of the combustor. Air is fed into the combustor such that two distinct burning regions are created. Each region approximates a "well-stirred reactor" and the combination of the two regions results in an efficient use of combustion volume.

In the primary burning region, the fuel-air stoichiometry varies from fuel-lean to fuel-rich and the reaction residence time is maximized by keeping the percentage of total air flow into this region as low as possible. In the second burning region, the fuel-air mixture is tailored to maintain the maximum possible combustion time for best efficiency throughout the engine envelope. The secondary region results in near-stoichiometric fuel/air ratios and consequently, maximum flame temperatures.

Non-reacting excess air is dumped into the engine flow stream just ahead of the turbine nozzle. Some air is dumped at the outer wall and some is passed around the combustor to provide external convective wall cooling. The combustor air flows and fuel injection are tailored to meet operating requirements.

The present invention therefore provides an inexpensive and reliable combustor system having a minimal frontal area for a miniature gas turbine engine which achieves stability throughout the flight envelope and combustion efficiency at cruise conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
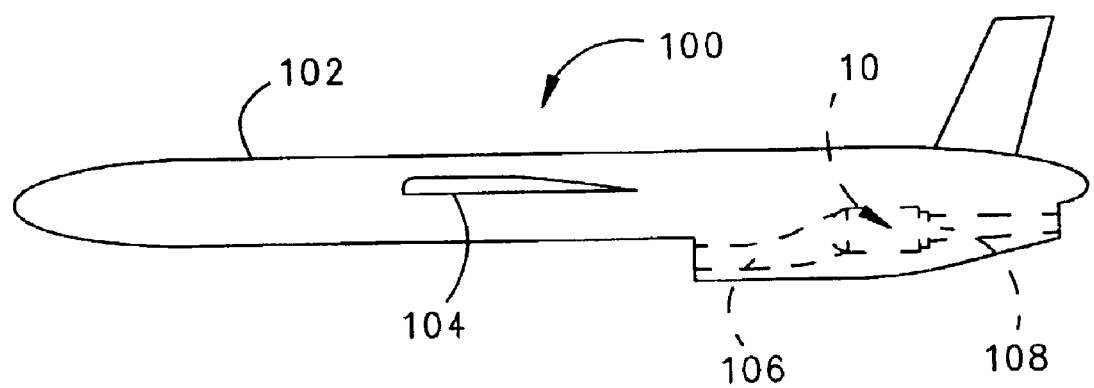
FIG. 1 is a general perspective view an exemplary vehicle embodiment for use with the present invention.

FIG. 1 illustrates a general schematic view of a vehicle 100 including an expendable miniature gas turbine engine 10 according to the present invention. The vehicle 100 includes a body 102 and one or more aerodynamic surfaces 104. The engine 10 is coupled to, or within, the body 102. An intake 106 provides air to the engine 10, and an exhaust pipe 108 exhausts the thrust therefrom. The engine 10 of the invention may also be used in other single usage and reusable applications such as reconnaissance drones, cruise missiles, decoys and other weapon and non-weapon applications.

Figure 2:
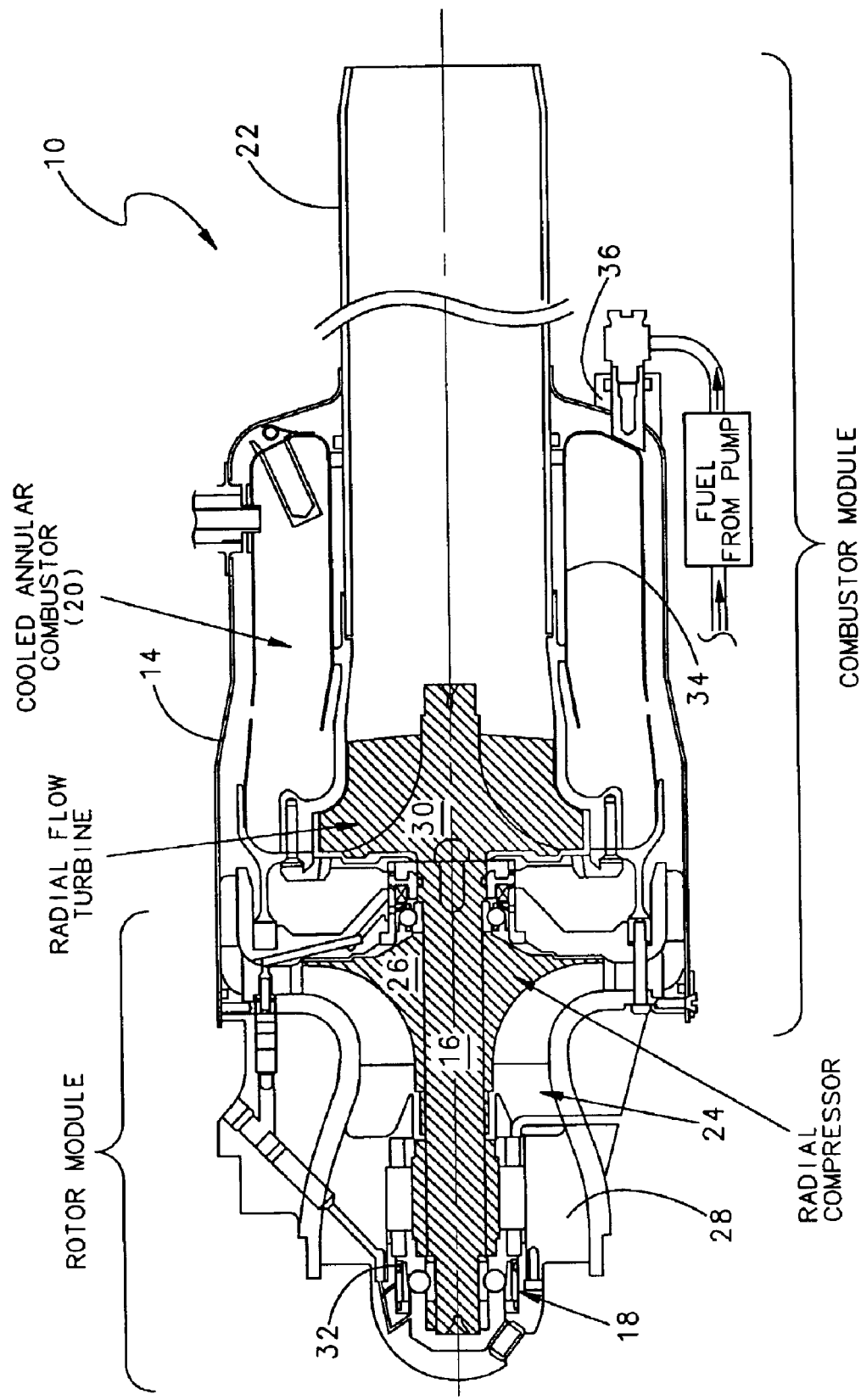
FIG. 2 is a schematic view of a gas turbine engine having a start system according to the present invention.

Referring to FIG. 2, the miniature gas turbine engine 10 generally includes a housing 14, a rotor shaft 16 rotationally mounted to a forward bearing 18, a combustion system 20 and an exhaust pipe (nozzle) 22. The rotor shaft 16 rotates about a longitudinal axis X although other forms of rotors, such as a monorotor configuration, would also benefit from the present invention. In the illustrated rotor configuration, a rotor 24 includes compressor blades 26 facing forward toward an inlet 28 and turbine blades 30 facing rearward toward the exhaust pipe 22 to define a turbine wheel. The forwardly extending shaft 16 is received in the bearings 18 and is preferably coupled to a fuel pump (illustrated schematically at 32) to provide fuel to an annular combustor liner 34 through a fuel manifold 36.

Figure 3:
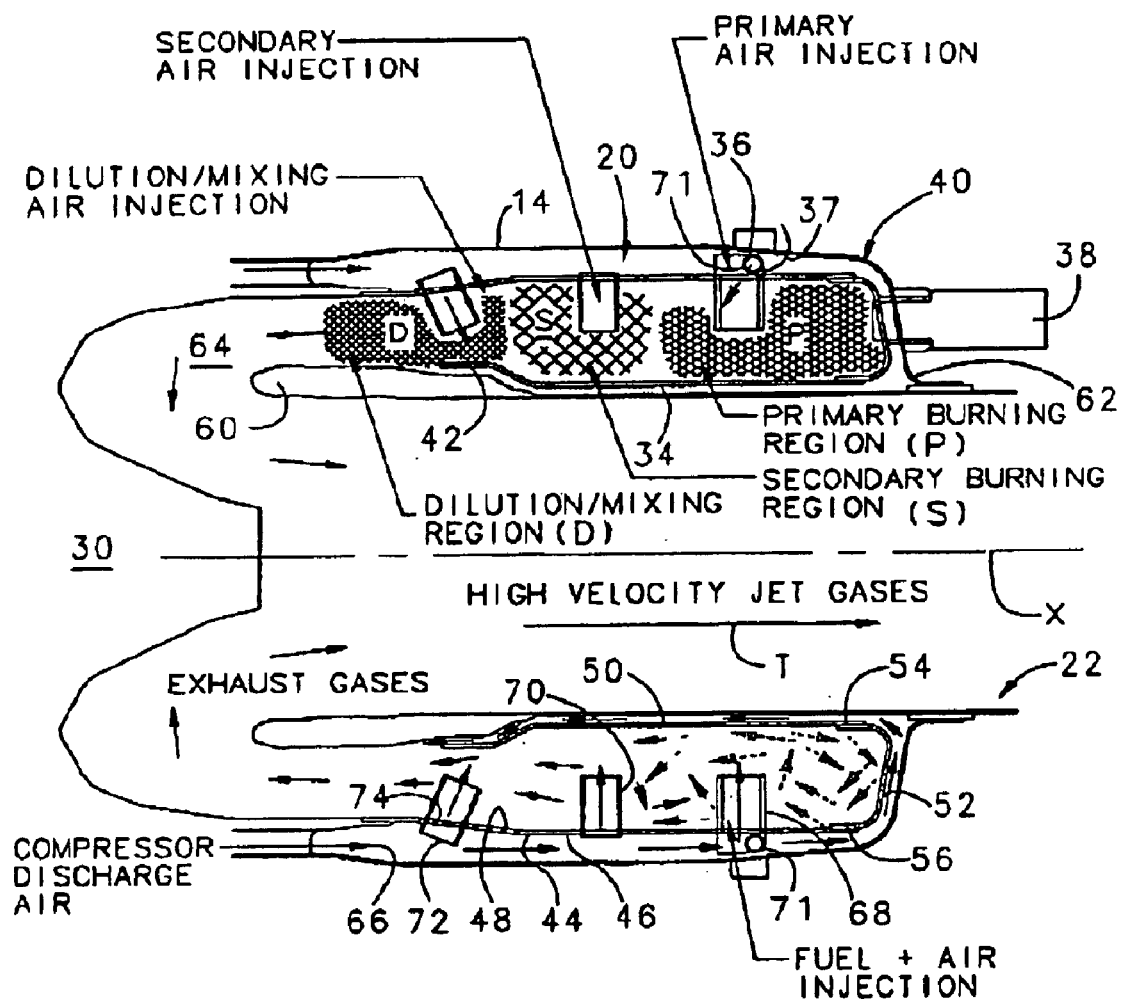
FIG. 3 is a longitudinal sectional view of a combustor system of FIG. 2.
Figure 4:
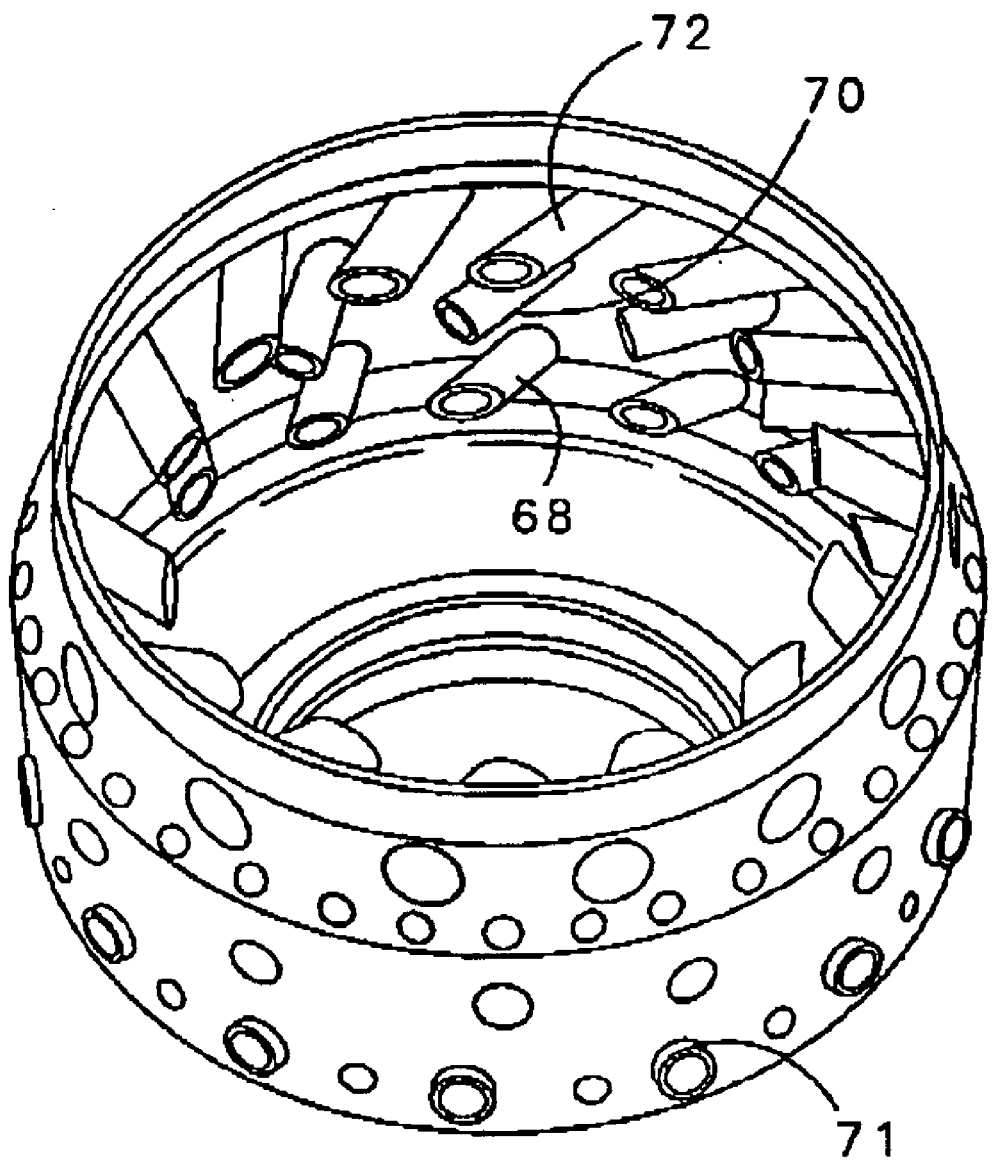
FIG. 4 is a radial sectional view of a primary burning region of the combustor system of FIG. 3.

Referring to FIG. 3, a cross-section of the combustion system 20 is illustrated. The combustion system 20 generally includes the annular combustor liner 34, the fuel manifold 36 and an igniter 38. The combustor liner 34 is a reverse flow annular combustor, and thus has a leading end 40 generally disposed toward the rear of turbine engine 10, and a trailing end 42 generally disposed toward the front of the turbine engine 10. The combustor liner 34 includes an outer wall 44 in the form of a metal tube having an outer surface 46 and an opposing inner surface 48. The combustor liner 34 further includes an inner wall 50 (not shown in FIG. 4), and a combustor dome 52 generally connected to, and joining, the inner and outer walls 44, 50 at respective annular lines of intersection 54 and 56.

The exhaust pipe 22 extends rearwardly of the engine 10 from throat 60, and interfaces with rear housing wall 62, whereby the combustor liner 34 is enclosed on its outer and rear surfaces by housing 14 and on its inner surface by the exhaust pipe 58. The combustor liner 34 interfaces with the exhaust pipe 22 through a combustor exit 64 such that exhaust gases from the combustor liner 34 are directed through the exhaust pipe 22 generating a high velocity thrust (illustrated schematically by arrow T).

A compressor discharge plenum 66 is located between the outer wall 44 of the combustor liner 34 and the housing 14. The discharge plenum 66 distributes air from the compressor system 20 (FIG. 2) into the combustor liner 34 through fuel-air tubes 68 which feed a fuel-rich mixture of fuel and air into the leading end 40 of the combustor liner 34 to form a primary burning region P. It should be understood that the term "tubes" is to be construed to broadly include openings, holes, apertures, bent metal deflectors and the like in addition to separate cylindrical member. Moreover, any hole shape, including elliptical, rectangular, triangular and any hole condition including plain sharp-edged, plunged and the like will benefit from the present invention.

Fuel is introduced into the combustor liner 34 through a fuel passageway 37 which communicates fuel from the fuel manifold 36 into each of the fuel-air tubes 68 through a fuel orifice 71. Fuel orifices 71 are preferably drilled holes which direct fuel into the fuel-air tubes 68 at a prescribed location. The fuel orifices 71 control fuel system pressure through proper predetermined sizing and quantity. The fuel orifices 71 preferably produce a predetermined allowable level of fuel pressure drop at the maximum required fuel flow rate such as 150 psid. The fuel orifices 71 essentially just pour fuel into fuel-air tubes 68. That is, fuel may just trickle from the fuel orifice 71 at low speed turbine engine 10 operation or a stream from the orifice 71 at high speed operation. At either extreme, a fine fuel spray is not necessary since a great deal of fuel-air mixing occurs within the fuel-air feed tubes 68 such that the fuel manifold 36 need not require precision machining.

Optimum fuel-air mixing is required to obtain optimum combustor performance. The fuel-air tubes 68 are preferably designed with enough length and air momentum/velocity to break up and evaporate as much fuel as possible. It should be understood that as the present invention is directed toward expendable gas turbine engines longevity concerns relating to extending the fuel-air tubes 68 relatively deep into the combustor 34 (FIG. 4) without complicated cooling systems is of minimal concern.

Since the fuel orifices 71 are relatively simple holes, and since the fuel-air tubes 68 are directly attached to the combustor liner 34, fueling is inexpensive and requires minimal hardware on the engine case. Control of the fuel flow rate into the fuel manifold is performed by any variable system. The size of the fuel orifices 71 is preferably set to maximize fuel jet velocity and maintain fuel flow uniformity from hole-to-hole.

The fuel-air mixture within the fuel-air tubes 68 is most preferably of a fuel-rich quality and the air velocities through these fuel-air tubes 68 are of relatively high velocity, e.g., Mach 0.3 and greater. The fuel injection of the present invention makes the combustor relatively independent of the type of fuel burned. A wide range of fuels ranging from gasesous (methane, propane, natural gas) to pure, light hydrocarbons (hexane, octane, butane) to aviation fuels (Jet-A, Jet-A1, JP-4, JP-5, JP-10, JP-8) to heavy diesel fuels (DF1, DF2, marine diesel) can be burned with fuel manifold system and combustor air apportionment readily available to one of ordinary skill in the art.

Since the primary zone stoichiometry is variable by design and since the reaction times in the primary zone are short by design, primary zone flame temperatures may be "tuned" such that they are low for certain chosen engine operating conditions. These predetermined designed low flame temperatures and short reaction times result in a combustion system that is capable of achieving extremely low levels of $NO_x$ with a wide variety of liquid fuels.

Initial ignition of the combustion process is performed by a spark-gap or pyrotechnic flare-type igniter 38 preferably located through the combustor dome 52. The igniter 38 is placed in a position down-swirl of one of the fuel-air tubes 68 to ensure contact with fuel as it enters the combustor liner 34. Under extreme cold conditions and at low engine speeds fuel break-up is preferably assisted by a jet of high-velocity air, oxygen or air/oxygen mixture directed into the fuel-air tube 68 just upstream of the igniter 38. This oxygen jet is used to improve ignition only and is not needed during normal combustor operation. Once ignition is initiated, the igniter is no longer needed since the combustor liner 34 is a continuous ignition device.

Figure 5:
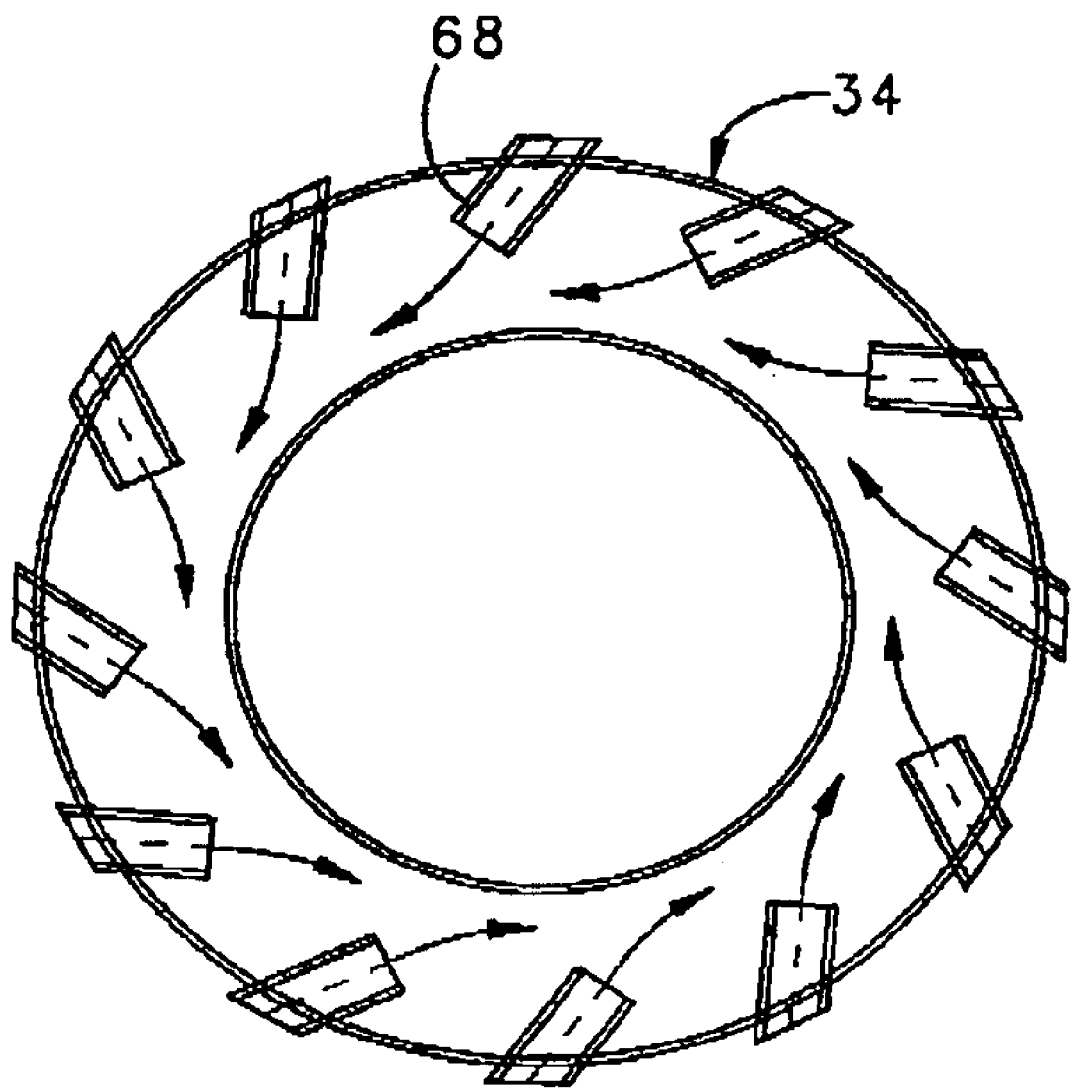
FIG. 5 is a perspective view of a combustor liner the combustor system of FIG. 2.

The air flow through fuel-air mixing tubes 68 breaks the fuel into small droplets and mixes the fuel with air before the fuel-air mixture enters the combustor liner 34. Fuel is further mixed with the combustion air by strong aerodynamic forces within the combustor. Fuel break-up occurs through air-blast atomization, tube-wall impingement and vaporization. The discharge direction of the fuel-air mixture is generally circumferential and axial aft as the fuel-air tubes 68 preferably extend into the combustor liner 34 as a circumferential row which directs the mixture generally toward the combustor dome 52 and igniter 38 (FIG. 5).

The fuel air mixture is mixed with additional air injected through a row of secondary air-feed tubes 70 downstream of the fuel-air tubes 68. The secondary air-feed tubes 70 are located approximately midway between the combustor dome 52 and the combustor exit 64 to form a secondary burning region S. It should be understood that the term "tubes" is to be construed to broadly include openings, holes, apertures, bent metal deflectors and the like in addition to separate cylindrical member. Moreover, any hole shape, including elliptical, rectangular, triangular and any hole condition including plain sharp-edged, plunged and the like will benefit from the present invention.

A row of dilution air-feed tubes 72 are located just upstream of the combustor exit 64 to form a final dilution mixing region D. The sets of tubes 68, 70 and 72 produce a generally circumferential air velocity into the combustor liner 34. It should be understood that the high degree of swirl produced via this air direction provides for high mixing and maximizes the path length experienced by the fuel entering the combustor.

The combustor liner 34 is maintained at acceptable temperature levels by designing the combustor liner 34 for high air velocities. The high air velocity through the compressor discharge plenum 66 and over the external portion of the combustor liner 34 provides for convective cooling. It should be understood that other combustor cooling techniques, e.g., splash cooling, film cooling, effusion cooling or the like which require air injection into the combustor may also be used, but is preferably designed to avoid interference with the primary and secondary burning. Such additional cooling techniques will necessarily require slightly larger combustor volumes.

The air flow into the combustor 34 is apportioned to provide the two burning regions P, S and the dilution-mixing region D. The two burning regions P, S allows the combustor liner 34 to operate at minimum overall burning time. In the primary burning region P, the fuel/air stoichiometry is preferably designed to be rich at full power engine operating conditions. Combustion occurs in this region at temperatures that maintain high enough flame speeds for adequate stability, but all the fuel cannot react. The fuel that is unable to react in the primary region P is mixed with air in the secondary region S and then burned. The secondary region S results in near-stoichiometric fuel/air ratios and consequently, maximum flame temperatures. It should be understood that one of skill in the art utilizing the teaching of the present invention is readily able to design such a near-stoichiometric fuel/air ratio.

The fuel/air ratios in the two burning regions P, S vary with engine operating condition, so the air apportionment within the combustor liner 34 is preferably designed to accommodate the full engine flight envelope. Flame temperatures within the primary burning region P are critical and must be maintained at all times in order to maintain stable, efficient combustion. If the primary region is too lean or too rich, the flame temperature drops and burning rates fall to levels too low to maintain combustion. Each combustion region approximates a "well-stirred reactor" and the combination of the two regions P, S results in a "best possible" use of combustion volume.

Downstream of the secondary burning region S, air is injected through a plurality of dilution air-feed tubes 72 to mix out the hot flame gases at the dilution-mixing region D adjacent the combustor exit 64. The dilution-mixing region D is designed to preferably provides cool enough temperatures to avoid damage to the downstream turbine 30. It should be understood that the mixing air may alternatively or additionally be introduced through tubes, drilled holes, or plunged holes and may be fed through the inner or outer combustor wall.

Figure 6:
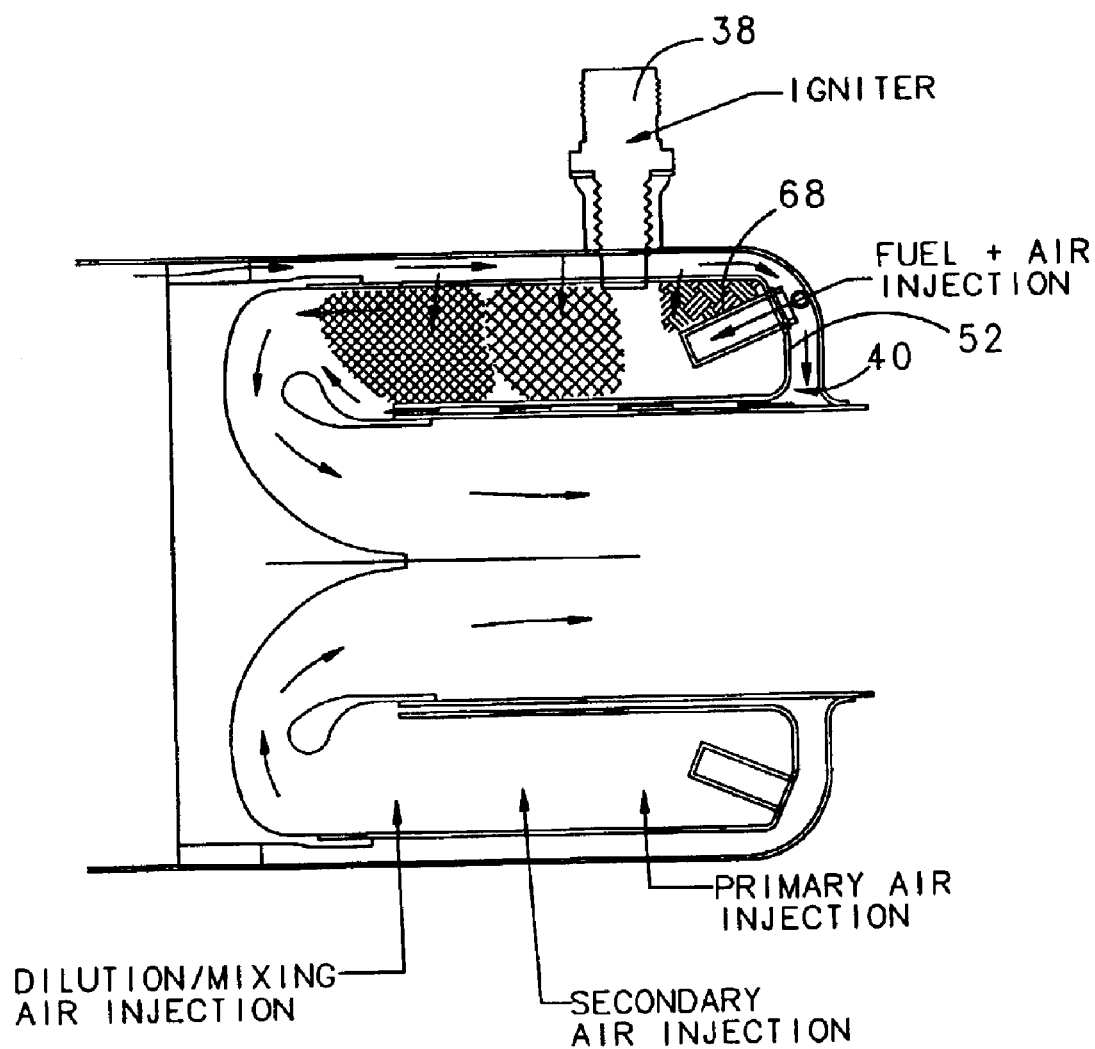
FIG. 6 is a longitudinal sectional view of another combustor system of the present invention.

Referring to FIG. 6, the igniter 38 is positioned between the two burning regions P, S and the fuel-air tubes 68 are located within the combustor dome 52 of the combustor liner 34. That is, the fuel-air tubes 68 are disposed toward the rear of turbine engine 10 through a leading end 40 of the combustor liner 34 generally between the inner and outer walls. The igniter 38 is placed in circumferential position about the outer wall of the combustor liner 34. The FIG. 6 arrangement provides advantages of the above-described design with different packaging constraints.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A combustion system for a miniature gas turbine engine comprising:
   an annular combustor liner having an outer wall;
   a plurality of fuel-air tubes extending into said annular combustor liner outer wall adjacent a leading segment of said combustor liner to form a primary burning region which approximates a well-stirred reactor;
   a plurality of secondary air only-feed tubes extending into said annular combustor liner outer wall downstream of said purality of fuel-air tubes to form a secondary burning region which approximates a well-stirred reactor to provide a near-stoichiometric fuel/air ratio;
   a plurality of dilution air only-feed tubes through said annular combustor liner outer wall downstream of said plurality of secondary air-feed tubes and which form a final dilution mixing region adjacent a combustor exit; and
   a fuel manifold which communicates fuel through a fuel orifice in at least one of said plurality of fuel-air tubes to provide a fuel/air stoichiometry in said primary burning region which tends towards rich stoichiometry at full engine power operating conditions.

2. The combustion system as recited in claim 1, wherein said plurality of fuel-air openings extend into said annular combustor liner to direct a fuel-air mixture toward a dome of said annular combustor liner.

3. The combustion system as recited in claim 2, further comprising an igniter located adjacent said dome of said annular combustor liner.

4. The combustion system as recited in claim 1, further comprising an igniter located between said primary and a secondary burning region.

5. The combustion system as recited in claim 1, wherein said plurality of fuel-air tubes extend into said annular combustor liner in a circumferential and axial aft orientation.

6. The combustion system as recited in claim 1, wherein airflow through said plurality of fuel-air openings draws fuel from said fuel orifice into said plurality of fuel-air tubes.

7. The combustion system as recited in claim 1, wherein said fuel orifice is located through a sidewall of at least one of said plurality of fuel-air openings.

8. The combustion system as recited in claim 1, wherein an air velocity through said plurality of fuel-air tubes is greater than Mach 0.3.

9. A method of operating a miniature gas turbine engine comprising the steps of:
   (1) communicating a fuel-air mixture into an annular combustor liner having an outer wall through a plurality of fuel-air tubes adjacent a leading segment of the combustor liner outer wall to form a primary burning region which approximates a well-stirred reactor while maintaining a stoichiometric fuel/air ratio which tends towards rich stoichiometry at full power engine operating conditions;
   (2) communicating only air into the annular combustor liner outer wall through a plurality of secondary air only-feed tubes to form a secondary burning region downstream of the primary burning region which approximates a well-stirred reactor while maintaining a near-stoichiometric fuel/air ratio within the secondary burning region at full engine power operating conditions; and (3) communicating only air into the annular combustion liner outer wall to form a final dilution mixing region downstream of the secondary burning region and adjacent a combustor exit.

10. A method as recited in claim 9, wherein said step (1) further comprises: directing said fuel-air mixture toward a leading segment of the annular combustor liner.

11. A method as recited in claim 9, wherein said step (1) further comprises: directing said fuel-air mixture circumferentially and axially aft in the annular combustor liner.

12. A method as recited in claim 9, wherein said step (1) further comprises: communicating fuel into only the primary burning region.

13. A method as recited in claim 9, wherein said step (1) further comprises: communicating fuel into the primary burning region to provide a fuel/air stoichiometry which is rich at full power engine operation.

14. A method as recited in claim 9, wherein said step (1) further comprises: communicating a quantity of fuel into the primary burning region such that a portion of the fuel is unable to react in the primary region; and reacting the portion of fuel which is unable to react within the secondary burning region.

15. A method as recited in claim 9, wherein said step (1) further comprises:

tuning said primary burning region for a predetermined engine operating condition.

16. A method as recited in claim 15, wherein said step (1) further comprises:

achieving a low level of $NO_x$ for the predetermined engine operating condition.

17. A method as recited in claim 9, wherein said step (1) further comprises: pouring fuel into at least one of a plurality of fuel-air tubes which extend into the primary burning region.

18. A method as recited in claim 9, wherein said step (1) further comprises: directing airflow with an air velocity greater than Mach 0.3 through a plurality of fuel-air tubes and into the primarily burning region.

* * * * *